(12) United States Patent
Steffensen

(10) Patent No.: US 8,201,340 B2
(45) Date of Patent: Jun. 19, 2012

(54) MEASURING STAFF

(75) Inventor: Bevan Gordon Steffensen, Gold Coast (AU)

(73) Assignee: Steffco Pty Ltd, Robina (AU)

( * ) Notice: Subject to any disclaimer, the term of this patent is extended or adjusted under 35 U.S.C. 154(b) by 317 days.

(21) Appl. No.: 12/672,304

(22) PCT Filed: Jul. 30, 2008

(86) PCT No.: PCT/AU2008/001094
§ 371 (c)(1),
(2), (4) Date: Feb. 5, 2010

(87) PCT Pub. No.: WO2009/018601
PCT Pub. Date: Feb. 12, 2009

(65) Prior Publication Data
US 2011/0289788 A1    Dec. 1, 2011

(30) Foreign Application Priority Data

Aug. 6, 2007  (AU) .............................. 2007904185
Sep. 4, 2007  (AU) .............................. 2007100847

(51) Int. Cl.
*G01C 15/06*  (2006.01)
(52) U.S. Cl. ........................................... 33/296; 33/809
(58) Field of Classification Search ................ 33/293, 33/294, 295, 296, 809
See application file for complete search history.

(56) References Cited

U.S. PATENT DOCUMENTS

| 739,035 | A |  | 9/1903 | Triner |
|---|---|---|---|---|
| 4,060,909 | A |  | 12/1977 | Collins |
| 4,318,228 | A | * | 3/1982 | Kimura ........................... 33/809 |
| 4,621,431 | A | * | 11/1986 | Fatool et al. ..................... 33/809 |
| 4,662,077 | A |  | 5/1987 | Richards |
| 4,899,452 | A |  | 2/1990 | Schafer |
| 5,414,942 | A | * | 5/1995 | Moore et al. .................... 33/809 |
| 5,687,486 | A |  | 11/1997 | Foltz |
| 6,209,210 | B1 |  | 4/2001 | Stout |
| 6,508,006 | B1 |  | 1/2003 | Black |
| 6,584,697 | B1 |  | 7/2003 | Guoan |
| 7,257,903 | B2 | * | 8/2007 | Lee ................................. 33/293 |
| 7,448,138 | B1 | * | 11/2008 | Vanneman ....................... 33/290 |
| 2008/0256812 | A1 | * | 10/2008 | Yandrick et al. ................ 33/294 |
| 2009/0235543 | A1 | * | 9/2009 | Hayashi et al. ................. 33/293 |

* cited by examiner

*Primary Examiner* — G. Bradley Bennett
(74) *Attorney, Agent, or Firm* — Shoemaker and Mattare

(57) ABSTRACT

A measuring staff (10) having a upper section (11) comprising a first elongated member (12) which can carry in a fixed position therealong a laser detector of a laser levelling system or a sighting marker of an optical measuring system, and a second elongated member (13) telescopically extendable and retractable relative to the first member (12), a graduated scale (18) on the first member (13) and a pointer (17) on the second member which indicates the extension or retraction of the second member (13) relative to the first member (12), a spring (20) for urging the second member (13) outwardly from the first member (11), the second member (13) being selectively lockable to the first member, and an extension section (14,15) at the lower end of the upper section and extendable therefrom.

20 Claims, 6 Drawing Sheets

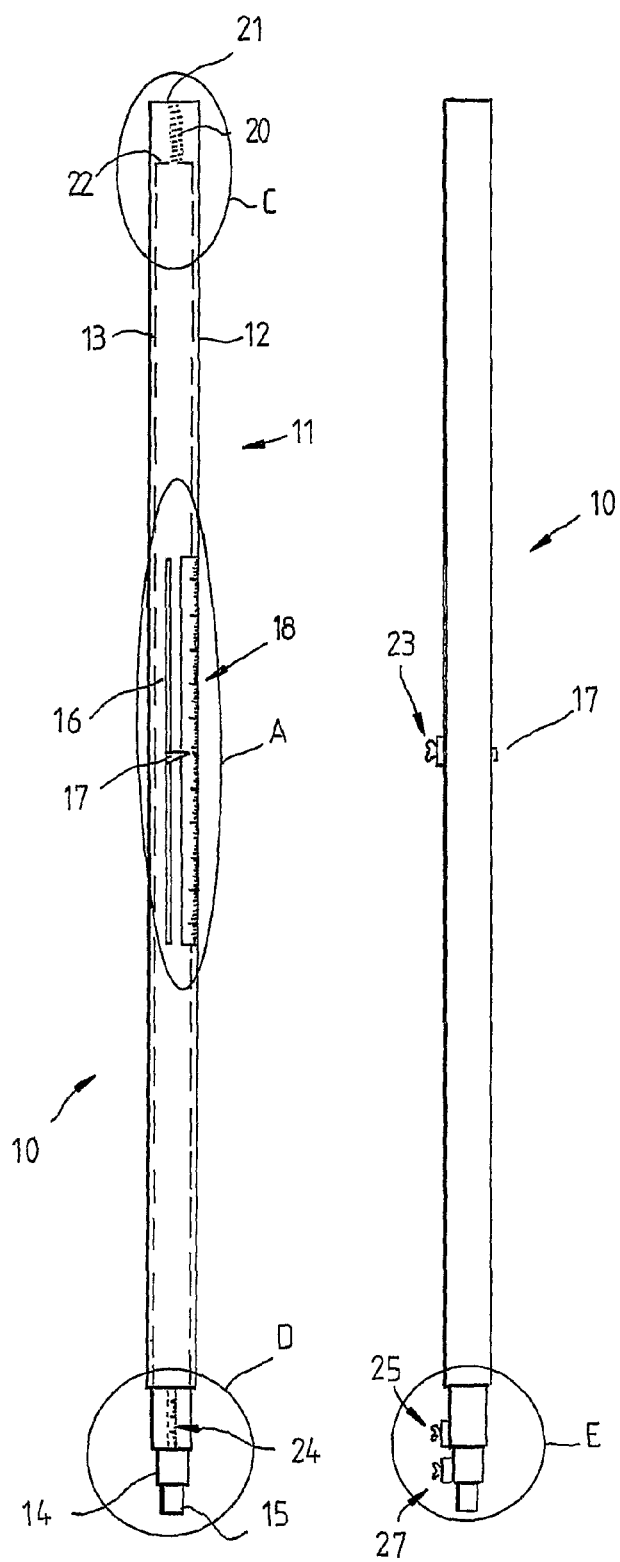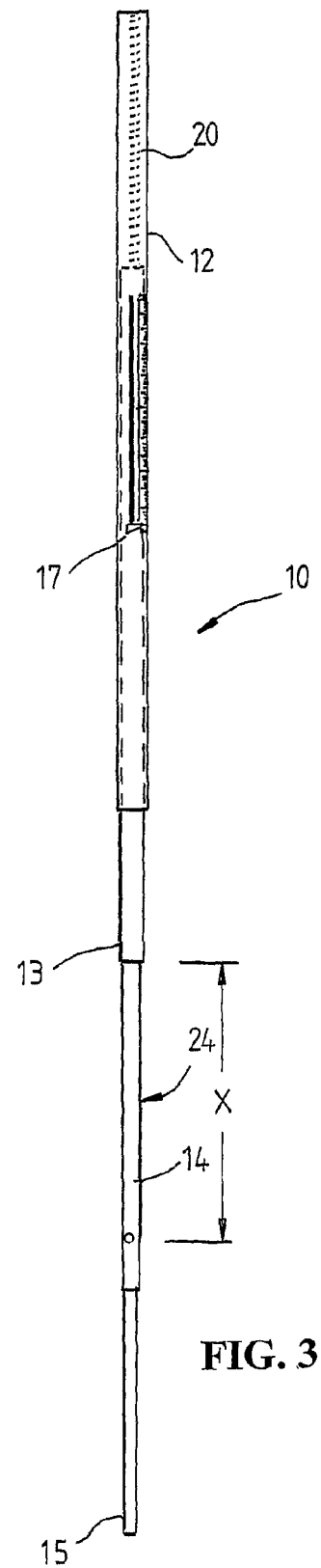
FIG. 1  FIG. 2  FIG. 3

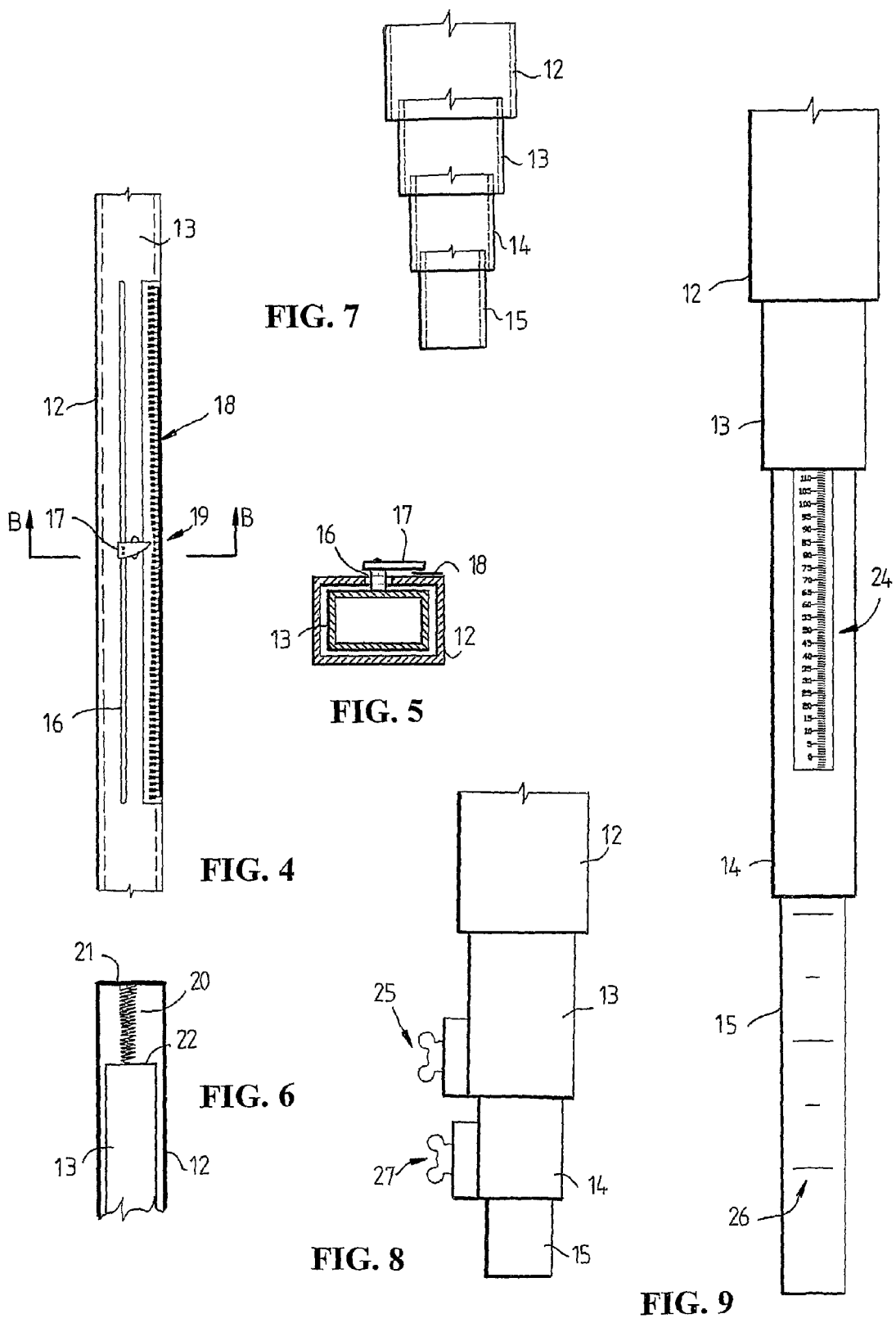

MEASURING STAFF

TECHNICAL FIELD

The present invention relates to a measuring staff and in particular to a measuring staff for use in a laser levelling or an optical or automatic levelling system. The measuring staff of the invention is particularly but not exclusively suitable for measuring depths of footings, excavations of trenches, bulk excavation of sites sub-grades, as a step-down gauge for blockwork and brickwork, checking floor levels and ceiling heights, heights for windows and doors, roof levels or any other application where accurate levels are required.

BACKGROUND ART

In laser levelling techniques a laser levelling unit is set up usually on a tripod at a levelling station which gives a clear view of all points to be leveled in a building site. The relative height of a viewing plane is then determined from a known benchmark level. A measuring staff can then be held vertically on a particular location on a site and the visible laser line which intersects the staff provides a reading from a graduated scale on the staff which enables the measurement to be read off by the staff bearer. Often an elongated length of wood is used instead of a graduated measuring staff and the line at which the laser beam intersects the staff is marked with a pencil or the like. If the same staff is used for taking multiple measurements at different locations around the site, many pencil or pen marks will appear on the staff and in these circumstances, ensuring that the correct levels are established can become difficult.

The laser levelling unit can also be used with a laser receiver or detector which is releasably clamped onto a graduated staff via a slidable clamp having a pointer and the clamp may be released and slid along the staff to adjust the position of the laser detector until the detector detects the laser beam at which position, the pointer indicates a measurement on the staff. Use of a laser detector in this manner is particularly awkward and does not guarantee that correct readings are taken. Every time the laser detector is moved, there is a chance it is moved too much, too little or in the wrong direction.

With a normal staff, the way to determine how high or low the ground etc. is relative to a datum plane is to either move the laser detector on the staff up or down as above or lift the staff off the ground if the ground is too low and estimate the height. Alternatively, if the ground is too high, the staff may be leant over until the laser detector receives the laser beam and an estimate is made of the height. These methods are clearly inaccurate.

Similar problems to those described above arise when an optical level such as a dumpy level is used in combination with a sighting marker which is mountable to the staff for movement therealong.

SUMMARY OF THE INVENTION

The present invention aims to provide a measuring staff which may be used with a laser levelling or optical levelling system for establishing correct levels in a building site or in any other levelling application. Other objects and advantages of the invention will become apparent from the following description.

The present invention thus provides in one aspect a measuring staff for use with a levelling system having level-defining device and a target, said staff comprising an upper section having a first elongated member and a second elongated member extendable and retractable relative to said first elongated member, means for selectively locking said first member to said second member, said sighting indicator being adapted to be located along said first member and fixed thereto in a position aligned in use with a datum plane defined by said level-defining device to define a datum level, a graduated scale on said first member and extending longitudinally therealong, indicating means movable with said second member and adapted to cooperate with said graduated scale whereby to provide, upon extension or refraction of said second elongated member relative to said first elongated member, measurements on said graduated scale of levels above or below said datum level, and a lower extension section extendable from and selectively lockable to said upper section.

Most preferably means are provided for urging the second elongated member towards an extended position relative to the first member when the second member is not locked to the first member. The urging means may comprise resilient means such as a spring suitably a compression spring.

Preferably the first and second members are telescopically engaged with each other. Preferably the second member extends into the first member and may be telescopically moved in relation thereto so as to extend therefrom and be retracatable into the first member.

The spring or other resilient means is suitably provided between the first and second members. The spring or other resilient means is suitably located within and captured within the first member between adjacent ends of the first and second members. The spring or other resilient means is thus resiliently compressed upon retraction of the first member into the second member. Suitably the spring or other resilient means connects the first member and to the second member. The spring may be located between and connected to adjacent walls of the first and second members.

Preferably the indicating means comprises a pointer or marker on the second member adapted to cooperate with the graduated scale to indicate the extension or retraction of the second member relative to the first member. Suitably the graduated scale comprises a linear scale and the pointer or marker is mounted for movement with the second member. Preferably an elongated slot is provided in and extends longitudinally of the first member adjacent and substantially parallel to the graduated scale and the pointer or marker is connected to the second member through the slot, the pointer or marker being movable with the second member. Typically the graduated scale and slot are provided intermediate opposite ends of the first member.

Preferably first and second members are adapted to be moved relative to each other to position the indicating means in a central or zero position along the graduated scale when the laser detector is aligned with the datum plane and the indicating means is moved in use in opposite directions from the central or zero position along the graduated scale upon extension or retraction of the second member relative to the first member to provide measurements from the central or zero position.

The graduated scale may comprise a pair of scales extending above and below the central or zero position. The scales of the pair are suitably arranged such as to provide readings which increase linearly above and below the zero position.

The respective graduated scales of the pair are suitably marked for example by being of different colours so as to be easily distinguishable from each other.

The lower extension section suitably has a scale for indicating the extension of the lower extension section from the second member. The lower extension section is suitably telescopically received within the second member. Suitably, the lower extension section includes at least one extendable and retractable elongated member, and the scale extends longitudinally along the at least one elongated member. Means may be provided for selectively locking the at least one elongated member against movement relative to said second member at a desired extension from the second member as indicated by the scale on the at least one elongated member. The at least one elongated member may comprise a third member or telescopically engaged third or fourth members. Preferably in the latter configuration, the third member is adapted to extend telescopically from the second member. The lower extension section however may include any number of telescopically engaged members. Suitably the scale on the lower section extension longitudinally thereof and is provided on each member thereof whereby the extension of each member from its adjacent member may be indicated.

The extension section preferably also includes an extendable and retractable elongated foot member. The foot member is suitably extendable and retractable relative to the third or fourth member and means are provided for indicating the extension of the foot member relative to the third or fourth member. Means are also suitably provided for selectively locking the foot member at a desired extension as indicated by the indicating means.

Preferably the foot member extends into the third or fourth member and may be telescopically moved in relation thereto.

The respective locking means suitably comprise a locking clamp or screw to lock respective members to each other. The locking clamp or screw may be mounted on one member and extended into engagement with another member to lock the one to the other member.

Preferably the means for indicating the extension of the foot member relative to the second member comprises a ruler or scale which is provided on and extends along the foot member and which cooperates with the member from which it extends to provide an indication of the extension of the foot member. The ruler or scale may comprise specified markings such heights of bricks or blocks. Respective rulers or scales may be provided on two or more faces of the fourth member, each carrying different markings to represent different brick or block heights.

The leveling system as above suitably comprises a laser leveling system but may comprise an optical measuring system in which case the laser detector is replaced by a target or a sighting marker.

Thus in this latter aspect, the present invention provides a measuring staff for use with a levelling system having a level defining device and a target, the measuring staff comprising an upper section having a first elongated member and a second elongated member extendable and retractable relative to said first elongated member, means for selectively locking said first member to said second member, said target being adapted to be located along said first member and fixed thereto in a position aligned in use with a datum plane defined by the level defining device to define a datum level, a graduated scale on said first member and extending longitudinally therealong, indicating means movable with said second member and adapted to cooperate with said graduated scale whereby to provide, upon extension or retraction of said second elongated member relative to said first elongated member, measurements on said graduated scale of levels above or below said datum level, and a lower extension section extendable from and selectively lockable to said upper section.

The first and second members are suitably adapted to be moved relative to each other to position the indicating means in a central or zero position along the graduated scale when the laser detector is aligned with the laser beam and the indicating means is moved in use in opposite directions from said central or zero position along the graduated scale upon extension or retraction of the second member relative to the first member to provide said measurements from the central or zero position.

In another aspect, the present invention provides a measuring staff comprising an upper section having a first elongated member and a second elongated member extendable from and retractable into a lower end of said first elongated member, means for selectively locking said first member to said second member, a graduated scale on said first member and extending longitudinally therealong, indicating means movable with said second member and adapted to cooperate with said graduated scale whereby to provide, upon extension or refraction of said second elongated member relative to said first elongated member, measurements on said graduated scale of levels above and below a datum level, and a lower extension section extendable from and selectively lockable to said upper section.

Means are suitably provided for urging the second elongated member towards an extended position relative to the first member when the second member is not locked by the locking means to the first member. The first and second members are suitably telescopically engaged with each other and the urging means comprises a spring between the first and second member. The second member is suitably extendable from and retractable into the first member. The spring is suitably located within the first member between adjacent ends of the first and second members, the spring being resiliently compressed upon retraction of the first member into the second member.

BRIEF DESCRIPTION OF THE DRAWINGS

In order that the invention may be more readily understood and put into practical effect, reference will now be made to the accompanying drawings which illustrate a preferred embodiment of the invention. The embodiment has been described in relation to a laser leveling system however the measuring staff of the invention may also be used with a dumpy level or other optical or automatic level. In the drawings:—

FIG. 1 is a side view of the measuring staff according to an embodiment of the invention in a retracted position;

FIG. 2 is a front view of the staff of FIG. 1;

FIG. 3 is a side view of the staff of FIG. 1 in a fully extended position (in reduced scale);

FIG. 4 is an enlarged view of the region A of FIG. 1;

FIG. 5 is an enlarged sectional view along line B-B of FIG. 4

FIG. 6 is an enlarged view of the region C of FIG. 1;

FIG. 7 is an enlarged view of the region D of FIG. 1;

FIG. 8 is an enlarged view of the region E of FIG. 2;

FIG. 9 is an enlarged view of the region D of FIG. 1 in an extended position of the staff;

DETAILED DESCRIPTION OF THE PREFERRED EMBODIMENT

Figure 10:
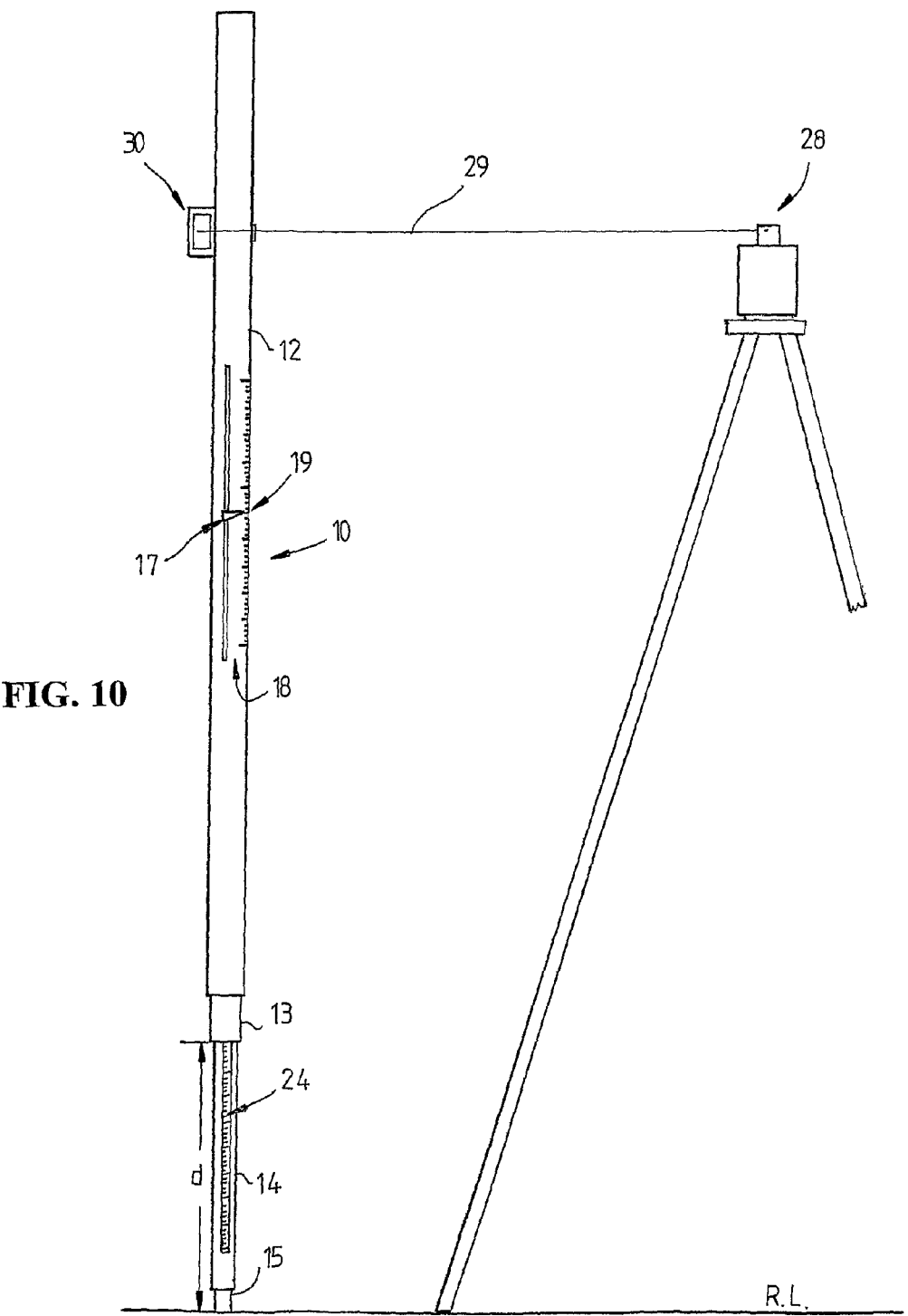
FIG. 10 illustrates the manner in which the staff is initially set up for use.

Referring to the drawings and firstly to FIGS. 1 and 2, there is illustrated a measuring staff 10 according to the present invention for use primarily in a rotary laser levelling system, the staff 10 having a normally upper section 11 comprising an outer elongated hollow member 12 formed of a rigid material such as aluminium and an inner hollow member 13 which is telescopically received in the hollow member 12, the member 12 for this purpose being of complementary shape to the member 11 and also being formed of a rigid material such as aluminium. The members 12 and 13 are preferably of a hollow square section however they may be of any other sectional configuration. The staff additionally includes a lower extension section extendable from the upper section 11, the lower section comprising an intermediate third member 14 telescopically extendable from the member 13 of the upper section and a lower extendable member or foot member 15 telescopically extendable from the intermediate member 14 such that the staff 10 is extendable from the refracted position of FIGS. 1 and 2 to the fully extended position of FIG. 3. The members 14 and 15 are also preferably of hollow square cross section and formed of aluminium or other rigid material although they may be of any other sectional configuration or material.

As shown in FIG. 1 and more clearly in FIGS. 4 and 5, the outer member 11 of the upper section 11 is provided with a longitudinally extending elongated slot 16 arranged at an intermediate position along the member 13 and a pointer or marker 17 is connected to the inner member 13 through the slot 16 for example by threaded connectors which project through the slot 16 such that the pointer or marker 17 is movable with the member 13 relative to the member 12. The outer member 12 is also provided with a linear graduated scale 18 which is parallel to and which extends substantially the same length as the slot 16 and is laterally aligned therewith such that the pointer or marker 17 can point to a reading on the scale 18 which enables the position of the pointer or marker 17 along the slot 16 to be read on the scale 18. In the illustrated embodiment, the graduated scale 18 extends symmetrically 200 mm on opposite sides of the central or zero position 19 of the pointer 17 which is at a central location longitudinally of the slot 16. The scale is marked to measure increasing distance of the pointer or marker 17 from the zero position 19 on opposite sides thereof. The scale 18 and slot 16 however may be of an increased length or reduced length.

The outer member 12 also houses a longitudinally extending compression spring 20 which is connected to and acts between an end wall 21 of the outer member 12 and the adjacent opposing end wall 22 of the inner member 13 as also shown in FIG. 6 such as to apply a resilient force to the inner member 13 to urge the inner member 13 when not constrained to a position extending from the outer member 12 and resiliently opposite movement of the inner member 13 into the outer member 12. The inner member 13 however remains connected to the outer member 12 by the spring 20.

A thumb screw or other locking screw 23 is mounted on the reverse side of the member 12 such that when the thumb or locking screw 23 is rotated in a clamping direction, it will extend into the member 12 to engage the inner member 13 to lock the inner member 13 against movement relative to the outer member 12. Tightening of the thumb or locking screw 23 to lock the member 13 relative to the member 12 thus allows the pointer 17 to be locked in any position along the slot 16 for example at the zero position 19 or on either side of the zero position 19.

The extendable intermediate member 14 which is complementary to the member 13 is telescopically receivable in the end of the member 13 whilst the foot member 15 is complementary to the member 14 and telescopically received in the member 14 as shown in FIGS. 7 and 8. The intermediate member 14 is provided with a ruler or scale 24 as shown more clearly in FIG. 9 which extends longitudinally therealong and cooperates with the member 13 to indicate by cooperation with the end of the member 13 the degree of extension of the first intermediate member 14 and foot member 15 from the member 13. In the position of FIG. 1 the scale 24 is hidden behind the member 13 and is at a zero position such that when the member 14 is extended from the member 13, the scale 24 provides a measurement of that extension for example the dimension X in FIG. 3.

Another thumb screw or other locking screw 25 similar to the screw 23 is provided on the member 13 to enable the intermediate member 14 to be locked in an extended position as desired relative to the member 13 and as indicated by the ruler or scale 24 thereon.

The second extendable member or foot member 15 is also provided with a scale or calibration markings 26 which are graduated at a plurality of block, brick or presto brick heights on three faces of the member 15 to indicate required levels for brick or block laying for step downs in footings to suit the bricks or blocks being used. A further thumb screw or other locking screw 27 is provided on the extendable member 14, the locking screw 27 when tightened locking the second extendable member 15 in a desired extension position relative to the extendable member 14.

In use for building on a site, the floor level for the building which is marked on the building plan is established from the reduced level (R.L) which provides a benchmark datum level for the building for establishing the floor level, overall height of the building and other levels. A surveyor will normally place the R.L. on the kerb which provides a level from which measurement is taken. For example, if the R.L. at the kerb is 1245 mm and floor slab R.L. is required to be 1760 mm, the R.L. for the floor slab is 515 mm above the R.L. mark.

The staff 10 is adjusted by sliding the member 13 longitudinally of the member 12 until the pointer 17 is in the central zero position 19 at which position, the member 13 is locked by the thumb screw 23. The lower foot member 15 is also fully retracted and locked in position by the thumb screw 27. The staff 10 is then adjusted by sliding the intermediate member 14 outwardly from the end of the member 13 so that it and the retracted foot 15 extend a total distance of "d" from the member 13, in this case at a reading of 515 mm on the ruler 24 at which position the member 14 is locked by the thumb screw 25 as shown in FIG. 10. The foot of the staff 10 is placed on the R.L. and the staff held in an upright position. A rotary laser level 28 is then set up level to establish a rotating laser beam 29 in a horizontal plane with the laser beam 29 intersecting the upright staff 10. A laser detector 30 is positioned on the member 12 of the staff 10 and moved or slid therealong until the beam 29 is detected by the detector 30 and centralised as indicated on a screen on the detector 30 for exact alignment of the detector 30 with the beam 29. The laser detector 30 is then locked or clamped to the member 12 which determines the datum R.L. Once the level is determined as above, the intermediate member 14 is slid back into the member 13 to the zero extension position as indicated on the ruler 24. The bottom of the retracted staff 10 is now at the floor slab R.L. as it has been retracted the distance "d" (or in the specific case described 515 mm) into the member 13. The user can then use the staff 10 to mark the floor slab R.L on a fixed member anywhere on the site which is not going to move such as a fence post by holding the staff 10 vertically, aligning the laser detector 30 with the beam 29 and making a mark on the fixed member. Each day when the laser 28 is reset, this mark having been previously determined is used to set the floor level (or floor R.L.). As the floor level relative to the datum R.L is now set, a number of functions can be undertaken, and measurements can be made, with the staff 10 without moving the laser detector 30 from its fixed position on the staff 10 as referred to above.

Figure 11:
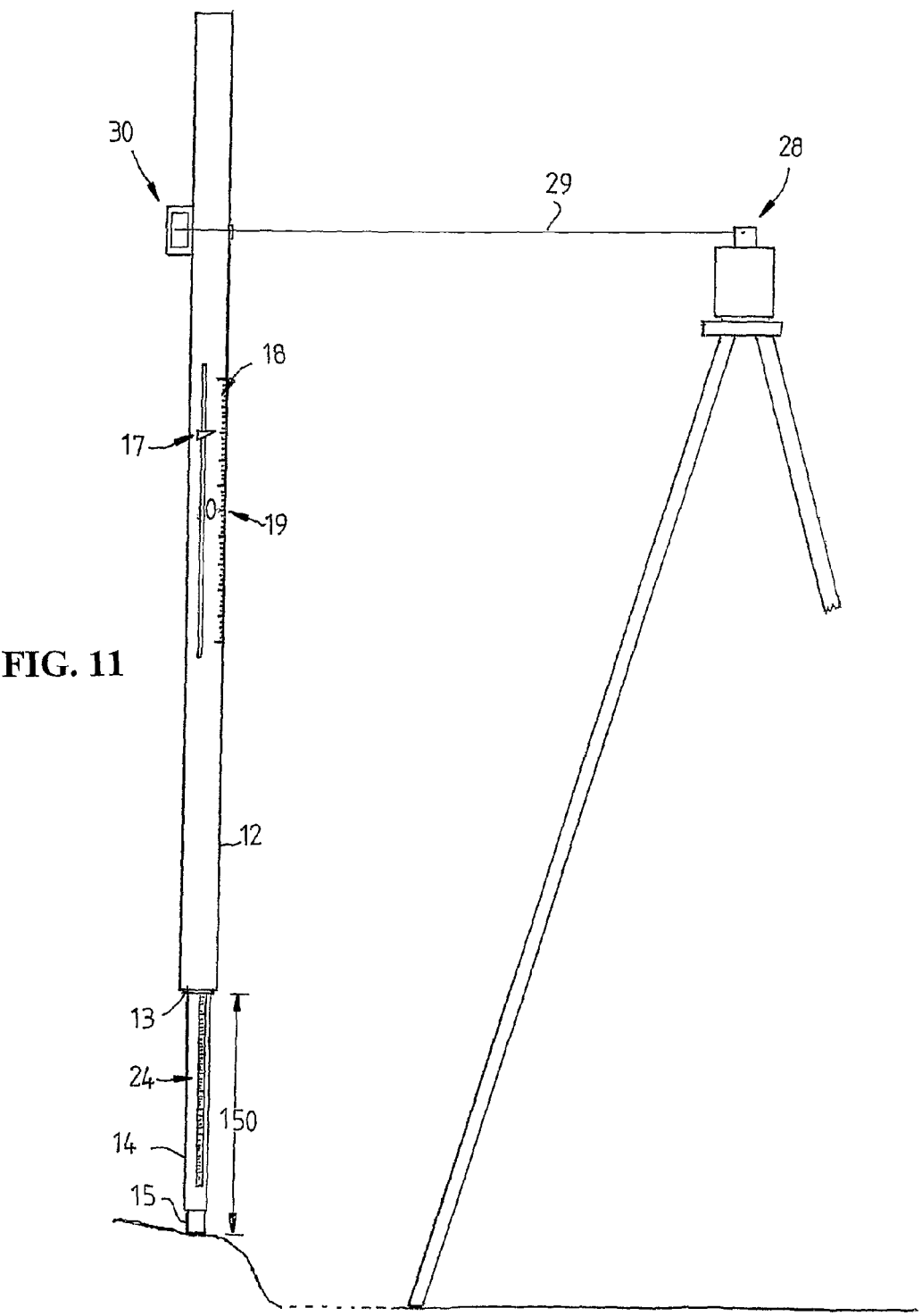
FIGS. 11 and 12 illustrates typical use of the staff of FIG. 1.

For example if a cut and fill is required for construction on a building site of a slab of a thickness of 100 mm with bedding sand of a thickness of 50 mm, the cut level on which the slab is to constructed is required to be 150 mm below the floor R.L. The intermediate member 14 of the staff 10 is extended 150 mm from the member 13 as indicated on the scale 24 and is then locked in place to the member 13 with the thumb screw 25 as shown in FIG. 11. The thumb screw 23 which locks the two members 12 and 13 of the upper section 11 together is then released which will allow the member 13 to be urged outwardly of the member 12 due to the force exerted by the spring 20. The bottom or foot member 15 of the staff 10 is then placed on the ground where the slab is to be formed and the outer member 12 longitudinally adjusted or slid relative to the inner member 13 until the laser detector 30 receives the beam 29 at which position the reading of the pointer 17 on the scale 18 will indicate whether the ground level is too high or too low. For example, if the pointer 17 is above the zero position 19 as shown in FIG. 11 which has occurred because the member 12 is pushed down against the spring 20 to retract the member 13 into the member 12, the measurement indicated on the scale 18 indicates how much the ground level is too high in relation the height of the cut. If the pointer 17 is on the lower side of the zero position 19 which occurs when the member 13 extends under the influence of the spring 20 further outwardly of the member 12, the reading of the pointer 17 on the scale 18 indicates how low the ground is in relation to the cut. By reading these measurements, an excavator can be told exactly how much he needs to either cut down or fill up to establish the correct level for the bedding sand and slab to be constructed thereon.

Figure 12:
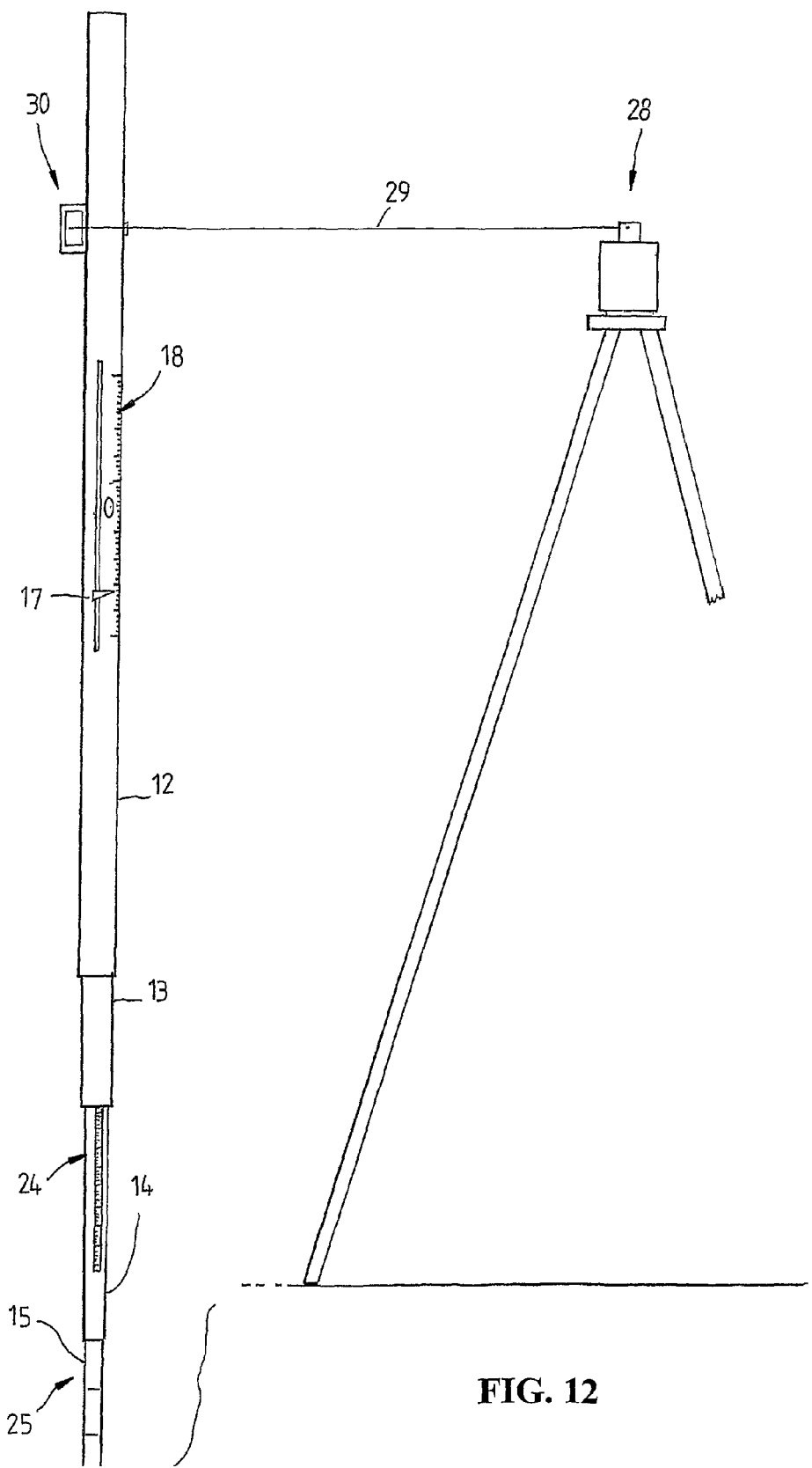

For digging footings, the depth of the footings below the slab R.L. are determined. For example for a 300 mm edge beam and a 400 mm deep footing, an excavation of 700 mm total below the floor R.L is required. Thus the intermediate member 14 is set at a 700 mm extension from the member 13 as indicated on the ruler 24 and locked in place. The member 13 is then released from the member 12 by release of the thumb screw 23 which permits the member 12 to slide in opposite directions up and down relative to the member 13 as allowed by the spring 20. The staff is then vertically positioned with the foot member 15 on the ground and the detector 30 aligned with the beam 29 and the reading of the pointer 17 on the scale 24 will provide a measurement of whether an excavator has dug too deep or not deep enough in a similar manner to that described in reference to FIG. 11.

Where it is necessary to step the footings for example where the land falls away, the foot member 15 is slid outwardly from the member 14 as shown in FIG. 12 to a marking on the scale 15 in accordance with the number of brickwork levels required. In the embodiment of FIG. 10, the member 15 is slid out three markings indicative of three levels of brickwork. The member 15 is then locked in position by the thumb screw 27 to lock it in the height required and the procedure described above in relation to FIG. 11 repeated to determine the excavation or fill required for the footing level.

In each of the above procedures, it will be apparent that there is no necessity to move the laser detector 30 which has been previously been set up in the correct position at the floor R.L. whereas the use of a conventional staff requires the detector 30 to be adjusted along a staff which inevitably leads to errors.

Figures 13, 14:
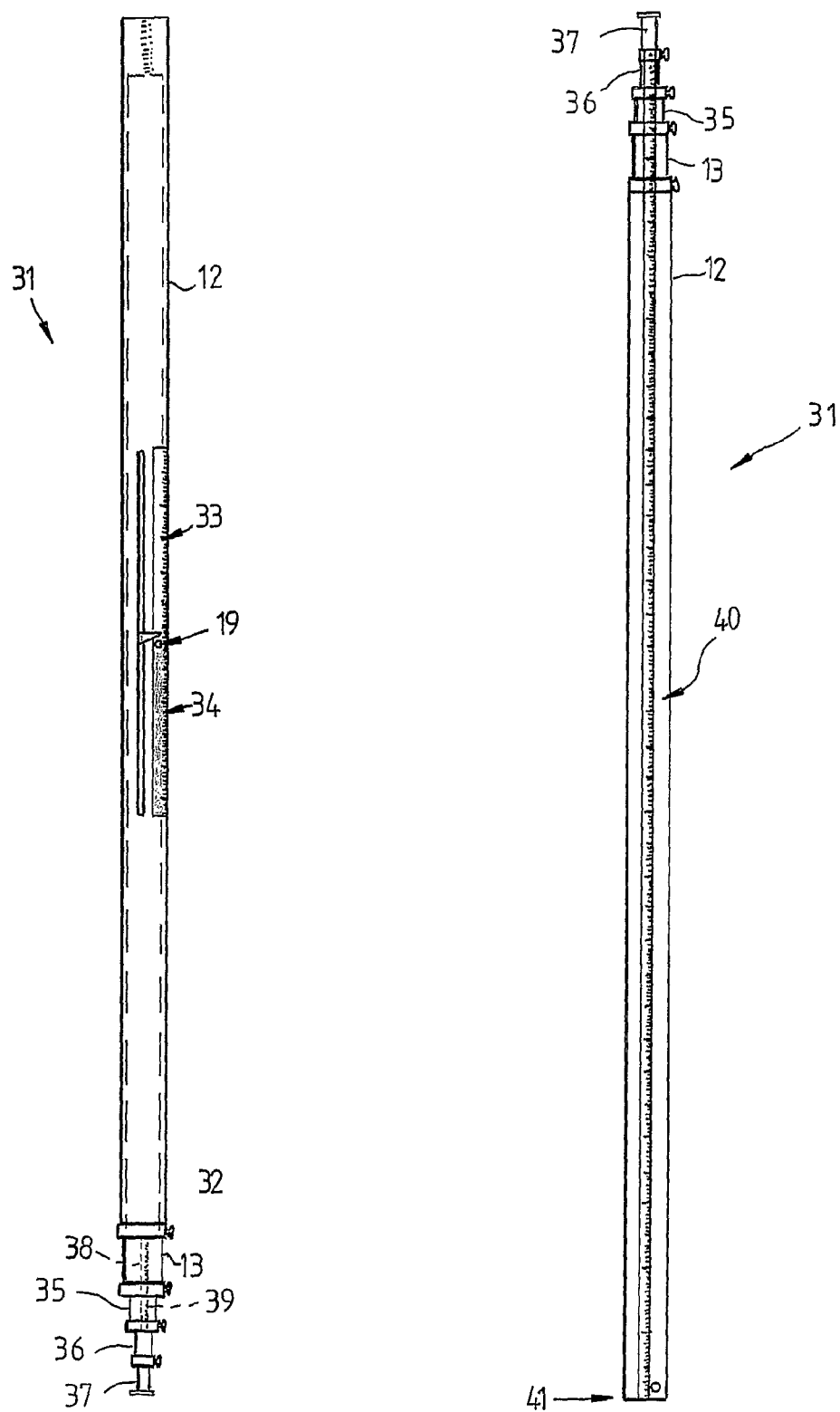
FIG. 13 illustrates a second embodiment of staff according to the invention.
FIG. 14 illustrates the staff of FIG. 13 from the opposite side and shown inverted for use as a conventional staff.

FIGS. 13 and 14 illustrate an alternative embodiment of measuring staff 31 according to the invention which is similar to the embodiment of FIGS. 1 to 9 and in which like components have been given like numerals. In this case however the inner member 13 is lockable to the outer member 12 for example to align the pointer 17 with the zero position on the scale 18 by means of a screw clamp 32 provided at the end of the member 13. The graduated scale 18 is provided two parts 33 and 34 which extend symmetrically to opposite sides of (that is above and below in FIG. 13) of the zero position 19. The parts 33 and 34 of the scale 18 may be provided in contrasting colours to enable easier distinguishing between the scale parts.

The staff 31 of FIGS. 13 and 14 also has an extension portion comprising three telescopic extendable members 35, 36 and 37 with the member 35 and 36 having longitudinally extending linear scales 38 and 39 respectively similar to the scale 24, the scale 38 indicating extension of the member 35 form the member 13 and the scale 39 indication extension of the member 36 form the member 35. The additional extendable member 36 in this embodiment provides a staff of increased extendable length which may be required for certain applications. The member 37 comprises a foot member and may be marked with brick or block heights as with the member 15 of the embodiment of FIGS. 1 to 9.

The staff 31 also includes as shown in FIG. 14 a scale 40 on its rear side which starts at a zero position 41 at the top of the member 12 in the orientation of the staff 31 shown in FIG. 13 but at the bottom of the member 12 in the orientation of the staff 31 shown in FIG. 14. The scale 39 extends as a continuous linear scale along each member 12, 13, 35 and 36 when the members 13, 35 and 36 are fully extended.

The staff 31 may be used in its orientation of FIG. 13 in the same manner as described with reference to FIGS. 10 to 12. The staff 31 however may also be inverted from its position of FIG. 13 and reversed to the position of FIG. 14 to enable it to be used as a conventional staff with measurements taken from the scale 40 either on the member 12 or one of the extended members 13, 35 and 36 to provide a distance from the zero position 41.

The staffs of the present invention allows for the determination of all the measurement height of the slab from kerb R.L., cut and fill heights to determine depth of cut or fill and depth of footings. Preparing of sand levels for the underside of a floor slab can be calculated at the office and a chart with all these dimensions recorded can be given to the site foreman who can give these to the concreter and excavator for the required site preparation for a building.

The staffs 10 and 31 may be used in many other applications such as in laying pipes, digging canals, checking if there are variations in the finished floor slab, placing concrete, measuring stepdowns for wet areas and garage slabs and preparing levels for a contour survey plan. The staffs 10 and 31 however can also be used in many other applications.

The members of the staffs of the invention are preferably aluminium extrusions of a square or rectangular cross section however the staff may be constructed of other materials. The staffs may also be used with any form of laser or other level such as optical levels which use a sighting marker which can be positioned along and fixed to the staff 10 or 31 in a similar manner to the positioning and fixing of the laser detector 30.

The terms "comprising" or "comprises" as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as herein defined in the appended claims.

The invention claimed is:

1. A measuring staff for use with a laser leveling system including a laser detector for detecting a laser beam, said staff comprising an upper section having a first elongated member and a second elongated member extendable and retractable relative to said first elongated member, means for urging said second elongated member towards an extended position relative to said first elongated member and opposing movement of said second elongated member to a retracted position relative to said first elongated member, means for selectively locking said first member to said second member, said laser detector being adapted to be located along said first member and fixed thereto in a position aligned in use with said laser beam to define a datum level, a graduated scale on said first member and extending longitudinally there along, indicating means movable with said second member and adapted to cooperate with said graduated scale whereby to provide, upon extension or retraction of said second elongated member relative to said first elongated member, measurements on said graduated scale of levels above or below said datum level, and a lower extension section extendable from and selectively lockable to said upper section, said lower extension section including a scale for indicating the extension of said lower extension section relative to said upper section.

2. A measuring staff as claimed in claim 1 wherein said urging means comprises resilient means.

3. A measuring staff as claimed in claim 2 wherein first and second elongated members are telescopically engaged with each other and wherein said resilient means comprises a spring between the first and second elongated members.

4. A measuring staff as claimed in claim 3 wherein said second member is extendable from and retractable into said first member.

5. A measuring staff as claimed in claim 4 wherein said spring is located within said first member between adjacent ends of said first and second members and extends longitudinally thereof, said spring being resiliently compressed upon retraction of said second member into said first member.

6. A measuring staff as claimed in claim 5 wherein said spring connects said first elongated member to said second elongated member.

7. A measuring staff as claimed in claim 1 wherein said first member includes a longitudinally extending slot adjacent to said graduated scale and wherein said indicating means includes a pointer or indicator connected to said second member through said slot and movable with said second member longitudinally of said slot.

8. A measuring staff as claimed in claim 1 wherein said first and second members are adapted to be moved relative to each other to position said indicating means in use in a central or zero position along said graduated scale when said laser detector is aligned with said datum plane and wherein said indicating means is moved in use in opposite directions from said central or zero position along said graduated scale upon extension or retraction of said second member relative to said first member to provide said measurements from said central or zero position.

9. A measuring staff as claimed in claim 8 wherein said graduated scale comprises a pair of scales extending above and below said central or zero position and wherein said scales of said pair of scales are marked to provide readings which increase linearly above and below said central or zero position.

10. A measuring staff as claimed in claim 9 wherein said scales of said pair are marked so as to be distinguishable from each other.

11. A measuring staff as claimed in claim 1 wherein said lower extension section is telescopically extendable from a lower end of said second member.

12. A measuring staff as claimed in claim 11 wherein said lower extension section includes at least one extendable and retractable elongated member, said scale of said lower extension section extending longitudinally along said at least one elongated member, and means for selectively locking said at least one elongated member against movement relative to said second member.

13. A measuring staff as claimed in claim 12 wherein said lower extension section including an elongated extendable or retractable foot, said foot being marked with a plurality of brick or block heights.

14. A measuring staff as claimed in claim 13 wherein said foot is telescopically engaged with said at least one extendable and retractable elongated member, and means for selectively locking said foot against movement relative to said at least one member.

15. A measuring staff as claimed in claim 14 wherein said at least one extendable and retractable elongated member comprises third and fourth telescopically engaged elongated members, and means for selectively locking said fourth elongated member against movement relative to said third elongated member.

16. A measuring staff as claimed in claim 1 wherein said graduated scale is provided on a first side of said staff and wherein the side of said staff opposite said first side is provided with a further graduated scale extending along said first elongated member, said second elongated member and said lower extension section whereby said staff can be inverted for use such that said second member and extension section may be extended upwardly from said first member.

17. A laser leveling system comprising a measuring staff and a laser detector for detecting a laser beam, said staff comprising an upper section having a first elongated member and a second elongated member extendable and retractable relative to said first elongated member, means for urging said second elongated member towards an extended position relative to said first elongated member and opposing movement of said second elongated member to a retracted position relative to said first elongated member, means for selectively locking said first member to said second member, means for mounting said laser detector in a fixed position along said first member in which it is aligned in use with said laser beam to define a datum level, a graduated scale on said first member and extending longitudinally there along, indicating means movable with said second member and adapted to cooperate with said graduated scale whereby to provide, upon extension or retraction of said second elongated member relative to said first elongated member, measurements on said graduated scale of levels above or below said datum level, and a lower extension section extendable from and selectively lockable to said upper section, said lower extension section including a scale for indicating the extension of said lower extension section relative to said upper section.

18. A laser leveling system as claimed in claim 17 wherein said first elongated member comprises an elongated hollow member and wherein said second elongated member is telescopically engaged with said first member to be extendable from, and retractable into said first elongated member, wherein said resilient means is located within said first elongated member and located between spaced end walls of said first and second members respectively.

19. A laser leveling system as claimed in claim 18 comprises a spring between the first and second elongated members.

20. A laser leveling system as claimed in claim 19 wherein said first member includes a longitudinally extending slot adjacent to said graduated scale and wherein said indicating means includes a pointer or indicator connected to said second member through said slot and movable with said second member longitudinally of said slot.

\* \* \* \* \*